(12) United States Patent
Kim

(10) Patent No.: US 9,194,457 B2
(45) Date of Patent: Nov. 24, 2015

(54) FREQUENCY-SENSITIVE SHOCK ABSORBER

(71) Applicant: MANDO CORPORATION, Pyeongtaek-si, Gyeonggi-do (KR)

(72) Inventor: Hark Joo Kim, Seoul (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 14/305,909

(22) Filed: Jun. 16, 2014

(65) Prior Publication Data

US 2015/0152936 A1    Jun. 4, 2015

(30) Foreign Application Priority Data

Dec. 4, 2013 (KR) .................. 10-2013-0150146

(51) Int. Cl.
*F16F 9/00* (2006.01)
*F16F 9/512* (2006.01)
*F16F 9/348* (2006.01)

(52) U.S. Cl.
CPC .............. *F16F 9/5126* (2013.01); *F16F 9/3485* (2013.01)

(58) Field of Classification Search
CPC ............. F16F 9/3228; F16F 9/48; F16F 9/49; F16F 9/516; F16F 9/34; F16F 9/3485
USPC .......... 188/281, 282.1, 282.5, 322.15, 322.22
See application file for complete search history.

(56) References Cited

U.S. PATENT DOCUMENTS

| | | | | |
|---|---|---|---|---|
| 5,226,512 A | * | 7/1993 | Kanari ...................... | 188/282.2 |
| 5,788,372 A | * | 8/1998 | Jones et al. ................ | 267/136 |
| 6,918,473 B2 | * | 7/2005 | Deferme .................. | 188/322.15 |
| 8,893,864 B2 | * | 11/2014 | Park ......................... | 188/322.13 |
| 2001/0037922 A1 | * | 11/2001 | Gotz ......................... | 188/320 |
| 2005/0045440 A1 | * | 3/2005 | Kock et al. ............... | 188/322.15 |
| 2005/0133319 A1 | * | 6/2005 | Wilhelm ................... | 188/281 |
| 2012/0305352 A1 | * | 12/2012 | Yu et al. .................... | 188/275 |
| 2012/0312648 A1 | * | 12/2012 | Yu et al. .................... | 188/280 |
| 2014/0048366 A1 | * | 2/2014 | Lee et al. .................. | 188/322.15 |

FOREIGN PATENT DOCUMENTS

| | | | | |
|---|---|---|---|---|
| DE | 102004001743 A1 | * | 8/2004 | ............... F16F 9/34 |
| KR | 2002-0040205 | * | 5/2002 | ............... F16F 9/32 |

OTHER PUBLICATIONS

Machine Translation of DE 102004001743.*
Abstract of KR 2002-0040205.*

* cited by examiner

*Primary Examiner* — Nicholas J Lane
(74) *Attorney, Agent, or Firm* — Hauptman Ham, LLP

(57) ABSTRACT

Provided is a frequency-sensitive shock absorber, which includes a cylinder filled with a working fluid and a piston rod having one end disposed inside the cylinder and the other end extending to the outside of the cylinder. The frequency-sensitive shock absorber includes a main piston valve assembly and an auxiliary piston valve assembly. The auxiliary piston valve assembly includes: a spool unit configured to open or close a communication passage for communicating a rebound chamber with a compression chamber while moving within a housing; and upper and lower support members configured to support the spool unit. The upper and lower support members have protrusions protruding toward the spool unit, respectively, and as the spool unit moves, the communication passage is closed when the protrusions of the upper and lower support members contact the spool unit.

5 Claims, 3 Drawing Sheets

FREQUENCY-SENSITIVE SHOCK ABSORBER

CROSS-REFERENCE(S) TO RELATED APPLICATION

This application claims priority of Korean Patent Application No. 10-2013-0150146, filed on Dec. 4, 2013, in the Korean Intellectual Property Office, the contents of which are incorporated herein by reference in its entirety.

BACKGROUND OF THE INVENTION

1. Field of the Invention

The present invention relates to a frequency-sensitive shock absorber, and more particularly, to a frequency-sensitive shock absorber configured to satisfy both a ride comfort and a steering stability, minimize a rise in costs, and make it advantageous to design basic components by controlling damping forces with respect to a small amplitude and a large amplitude during a compression stroke and a rebound stroke of a piston valve.

2. Description of the Related Art

Generally, suspension systems are installed in vehicles so as to improve a ride comfort by absorbing and damping a vibration or shock which is transferred from a road surface to an axle during driving. As one of such suspension systems, a shock absorber is used.

The shock absorber operates with a vibration of a vehicle according to a condition of a road surface. At this time, a damping force generated by the shock absorber is varied according to an operating speed of the shock absorber, that is, a high or low operating speed of the shock absorber.

A ride comfort and a driving stability of a vehicle may be controlled according to how to adjust a damping force characteristic generated by the shock absorber. Therefore, in designing the vehicle, it is very important to adjust the damping force characteristic of the shock absorber.

A conventional piston valve is designed to have a constant damping characteristic at a high speed, a medium speed, and a low speed. Therefore, when intending to improve a ride comfort by reducing a low-speed damping force, a medium- or high-speed damping force may also be influenced. In addition, a conventional shock absorber has a configuration in which a damping force is varied according to a change in a speed of a piston, regardless of a frequency or a stroke. In the case of the damping force varied according to only the change in the speed of the piston, the same damping force is generated in various road conditions. Consequently, it is difficult to satisfy both the ride comfort and the steering stability.

Therefore, there is a need for continuous research and development for a valve structure of a shock absorber, which is capable of varying a damping force according to various road conditions, that is, a forcing frequency and a stroke, to thereby satisfy both the ride comfort and the steering stability.

There is also a need for a valve structure of a shock absorber, which is advantageous to mass production and fabrication automation and is capable of implementing performance desired by a designer in a structure for opening or closing a passage so as to vary a damping force and reducing the number of parts by simplifying the structure, thereby reducing manufacturing costs.

CITATION LIST

Patent Literature
Japanese Utility Model Publication No. H5-36149

SUMMARY OF THE INVENTION

The present invention has been made in an effort to solve the above problems and is directed to provide a frequency-sensitive shock absorber, in which an auxiliary valve generating a damping force varying according to a frequency is installed together with a piston valve to thereby satisfy both the ride comfort and the steering stability, minimize a rise in costs, and make it advantageous to design basic components.

According to the present invention, there is provided a frequency-sensitive shock absorber, which includes a cylinder filled with a working fluid and a piston rod having one end disposed inside the cylinder and the other end extending to the outside of the cylinder, the frequency-sensitive shock absorber including: a main piston valve assembly installed at one end of the piston rod and configured to operate in a state in which the inside of the cylinder is divided into a rebound chamber and a compression chamber, and generate a damping force varying according to a moving speed; and an auxiliary piston valve assembly configured to move together with the main piston valve assembly and generates a damping force varying according to a frequency, wherein the auxiliary piston valve assembly includes: a spool unit configured to open or close a communication passage for communicating the rebound chamber with the compression chamber while moving within the housing; and upper and lower support members configured to support the spool unit, wherein the upper and lower support members have protrusions protruding toward the spool unit, respectively, and as the spool unit moves, the communication passage is closed when the protrusions of the upper and lower support members contact the spool unit.

The spool unit may include: a spool configured to move upward and downward within the housing; and upper and lower disks configured to support the spool disposed therebetween.

The upper and lower disks may have through-holes, and the through-holes may be positioned to be outer than a position where the protrusions are contacted, so as to block the communication passage when the upper and lower disks contact the protrusions.

The communication passage may include a connection passage inside the piston rod, an upper space inside the housing, through-holes formed in the upper and lower disks, a lower space inside the housing, and a hole formed in a lower washer mounted on a lower opening of the housing.

The upper and lower support members are made of an elastic member.

DETAILED DESCRIPTION OF EXEMPLARY EMBODIMENTS

Hereinafter, a frequency-sensitive shock absorber according to a preferred embodiment of the present invention will be described in detail with reference to the accompanying drawings.

Figure 1:
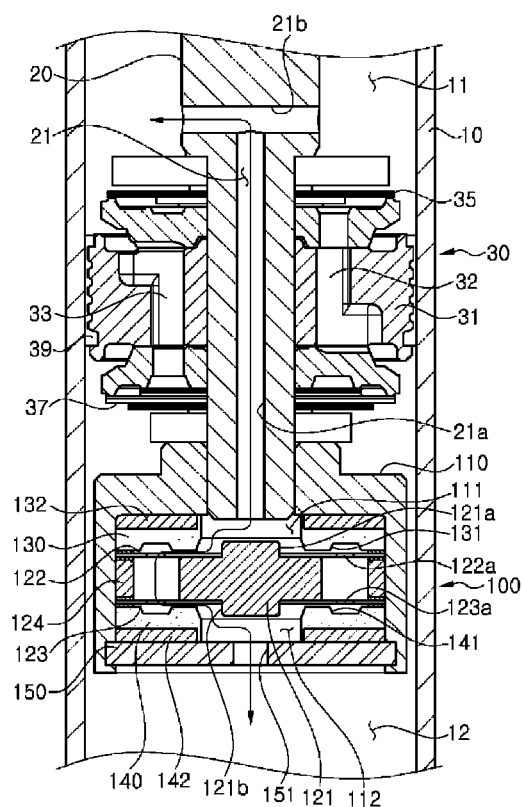
FIG. 1 is a cross-sectional view illustrating a valve structure of a frequency-sensitive shock absorber according to the present invention.

As illustrated in FIG. 1, a frequency-sensitive shock absorber includes a cylinder 10 and a piston rod 20. The cylinder 10 has a substantially cylindrical shape and is filled with a working fluid such as oil. The piston rod 20 has one end disposed inside the cylinder and the other end extending to the outside of the cylinder.

The valve structure of the shock absorber according to the present invention includes a main piston valve assembly 30 and an auxiliary piston valve assembly 100. The main piston valve assembly 30 is installed at one end of the piston rod 20 and is configured to operate in a state in which the inside of the cylinder 10 is divided into a rebound chamber 11 and a compression chamber 12, and generate a damping force varying according to a moving speed. The auxiliary piston valve assembly 100 moves together with the main piston valve assembly 30 and generates a damping force varying according to a frequency.

The main piston valve assembly 30 and the auxiliary piston valve assembly 100 are continuously installed at an end of the piston rod 20. The other end of the piston rod 20 slidably and liquid-tightly passes through a rod guide and an oil seal and extends to the outside of the cylinder.

The main piston valve assembly 30 may include: a main piston boy 31 having one or more main compression passages 32 through which the working fluid passes during the compression stroke of the shock absorber and one or more main rebound passages 33 through which the working fluid passes during the rebound stroke of the shock absorber; a main compression valve portion 35 disposed on the main piston body 31 to generate a damping force against a pressure of the working fluid having passed through the main compression passages 32; and a main rebound valve portion 37 disposed below the main piston body 31 to generate a damping force against a pressure of the working fluid having passed through the main rebound passages 33.

In addition, a lubricating member 39, for example, a Teflon band, may be installed in an outer periphery of the main piston body 31 so as to prevent tight contact with an inner periphery of the cylinder 10 and prevent abrasion.

The main piston valve assembly 30 is not limited to the configuration of FIG. 1, and the present invention is not limited to the configuration of the main piston valve assembly 30. The configuration of the main piston valve assembly 30 is merely exemplary.

The auxiliary piston valve assembly 100 according to the present embodiment includes: a hollow housing 110 mounted on a lower end of the piston rod 20 such that the housing 110 is disposed below the main piston valve assembly 20; a spool unit 120 which opens or closes a passage while moving within the housing 110 according to an input frequency; upper and lower support members 130 and 140 which elastically support the spool unit 120 within the housing 110; and a lower washer 150 mounted to close a lower opening of the housing 110.

The internal space of the housing 110 may be divided into an upper space 111 and a lower space 112 by the spool unit 120. The upper space 111 of the housing 110, which is a space above the spool unit 120, may communicate with the rebound chamber 11 through a connection passage 21 formed within the piston rod 20. The lower space 112 of the housing 110, which is a space below the spool unit 120, may communicate with the compression chamber 12 through a hole 151 formed in the lower washer 150.

The connection passage 21 formed within the piston rod 20 is exemplarily illustrated as being penetrated such that a vertical passage 21a and a horizontal passage 21b intersect with each other as illustrated in FIG. 1, but the connection passage 21 may have other structures as long as it can connect the internal space of the housing 110 (further, the compression chamber 12) to the rebound chamber 11 while detouring the main piston valve assembly 30.

The spool unit 120 may include: a spool 121 moving upward and downward within the internal space of the housing 110 according to the frequency (amplitude); upper and lower disks 122 and 123 disposed above and below the spool 121 to support the spool 121 disposed therebetween; and a spacer 124 having substantially the same thickness as the spool 121 and disposed between the upper disk 122 and the lower disk 123 such that the upper and lower disks 122 and 123 become substantially parallel to each other.

The spool 121 has a disk shape in which a thickness of a central portion is thicker than a thickness of an outer periphery. Upper and lower stepped portions 121a and 121b are formed in the central portion of the spool 121 and may be fitted into center holes formed in the centers of the upper and lower disks 122 and 123.

Through-holes 122a and 123a are formed in the upper and lower disks 122 and 123 such that the working fluid can flow between the upper space 111 and the lower space 112 in a state in which no external force is applied to the spool 121 and the upper and lower disks 122 and 123.

In order to maintain the spool 121 at a neutral position when no external force is applied, the upper support member 130 is positioned between the inner upper surface of the housing 110 and the upper disk 122 of the spool unit 120, and the lower support member 140 is disposed between the lower disk 123 of the spool unit 120 and the lower washer 150.

The upper and lower support members 130 and 140 have a ring shape and contact the outer upper surface of the upper disk 122 and the outer lower surface of the lower disk 123, respectively. In addition, the upper and lower support members 130 and 140 have protrusions 131 and 141 protruding toward the upper and lower disks 122 and 123, respectively.

According to the present embodiment, while the spool 121 moves upward and downward according to the input frequency, the flow of the working fluid is blocked when the protrusions 131 and 141 formed in the upper and lower support members 130 and 140 contact the upper and lower disks 122 and 123 in a circular shape over the entire circumference.

The upper and lower support members 130 and 140 having the protrusions 121 and 141 are made of an elastic member such as a rubber. Therefore, as compared with a case where a metallic spool 121 is configured to block a hole formed in a metallic lower washer or a metallic piston rod, the present invention can certainly block the flow of the working fluid when the protrusions 131 and 141 contact the upper and lower disks 122 and 123 and can also prevent generation of noise.

The upper and lower support members 130 and 140 may be made of an elastic member such as a rubber in their entirety. As illustrated, the upper and lower support members 130 and 140 may be made by attaching an elastic member such a rubber to disk-shaped seam members 132 and 142.

In order to block the flow of the working fluid when the upper and lower disks 122 and 123 contact the protrusions 131 and 141, the through-holes 122a and 123a formed in the upper and lower disks 122 and 123 are positioned to be much outer than the position where the protrusions 131 and 141 are contacted.

A distance between the protrusion 141 of the lower support member 140 and the lower disk 123 is smaller than a distance between the lower stepped portion 121b on the spool 121 and the lower washer 150 mounted on the lower opening of the housing 110.

A distance between the protrusion 131 of the upper support member 130 and the upper disk 122 is smaller than a distance between the upper stepped portion 121a on the spool 121 and the lower end of the piston rod 20 (i.e. a lower opening of the vertical passage 21a).

Each of the upper and lower disks 122 and 123 supporting the spool 121 disposed therebetween is exemplarily illustrated as a single disk in FIG. 1, but, if necessary, the upper and lower disks 122 and 123 may have a structure in which two or more disks are overlapped, as long as the working fluid can flow through the disks. In the structure in which a plurality of disks are overlapped, through-holes may be formed in each of the disks, or passages may be formed to have a constant area when overlapping the disks after forming slits or openings having different shapes.

The lower washer 150 closing the lower opening of the housing 110 may be coupled to the housing 110 by screw connection. After inserting the lower washer 150, the lower washer 150 may be fixed by deforming the housing 110. Alternatively, after inserting the lower washer 150, the lower washer 150 may be fixed by coupling a separate coupling member to the housing 110.

Hereinafter, the operation of the valve structure according to the preferred embodiment of the present invention will be described with reference to FIGS. 1 to 3.

Figure 2:
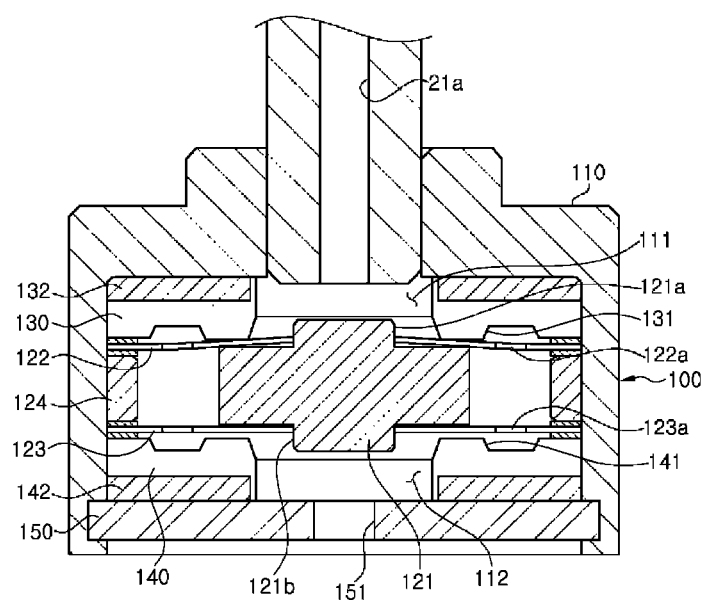
FIG. 2 is a cross-sectional view for describing main parts in the valve structure of the frequency-sensitive shock absorber during a low-frequency compression stroke according to the present invention.
Figure 3:
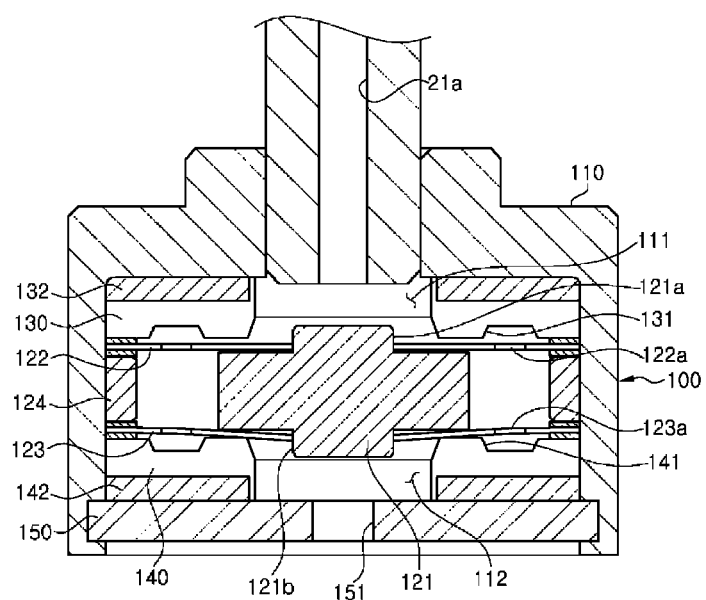
FIG. 3 is a cross-sectional view for describing main parts in the valve structure of the frequency-sensitive shock absorber during a low-frequency rebound stroke according to the present invention.

FIG. 1 illustrates the position of the spool unit 120 in a high-frequency (small-amplitude) mode, and FIGS. 2 and 3 illustrate the position of the spool unit 120 in a low-frequency (large-amplitude) mode. More specifically, FIG. 2 illustrates the position of the spool unit 120 during a low-frequency compression stroke, and FIG. 3 illustrates the position of the spool unit 120 during a low-frequency rebound stroke.

When an external force such as inertia and a pressure of the working fluid is applied, the spool 120 may move upward and downward while deforming the upper and lower disks 122 and 123 and the upper and lower support members 130 and 140. That is, the spool 121 moves upward or downward if the external force applied to the spool unit 120 is strong enough to deform the upper and lower disks 122 and 123 and the upper and lower support members 130 and 140.

FIG. 1 illustrates a state in which the moving amplitude of the piston rod of the shock absorber is small and the frequency is high, and thus, the external force applied to the spool unit 120 is not strong enough to deform the upper and lower disks 122 and 123 and the upper and lower support members 130 and 140. In a state in which the spool 121 does not move, the working fluid may flow through the through-holes 122a and 123a formed in the upper and lower disks 122 and 123.

In addition, even in a case where the spool 121 moves due to the application of the external force, but the external force applied to the spool unit 120 is not strong enough to move until the upper and lower disks 122 and 123 contact the protrusions 131 and 141 of the upper and lower support members 130 and 140, the through-holes 122a and 123a formed in the upper and lower disks 122 and 123 maintain the opened state.

At this time, the auxiliary piston valve assembly 100 generates a damping force due to the flow of the working fluid generated by the movement of the spool 121.

In addition, the passage between the compression chamber 12 and the rebound chamber 11 (that is, the passage formed by the connection passage 21 inside the piston rod 20, the upper space 111 inside the housing 110, the through-holes 122a and 123a of the upper and lower disks 122 and 123, the lower space 112 inside the housing 110, and the hole 151 of the lower washer 150) is in the opened state.

FIGS. 2 and 3 illustrate a state in which the moving amplitude of the piston rod of the shock absorber is large and the frequency is low, and thus, the external force applied to the spool 121 is so strong that the upper and lower disks 122 and 123 and the upper and lower support members 130 and 140 are deformed and then the upper and lower disks 122 and 123 contact the protrusions 131 and 141. At this time, since the upper and lower disks 122 and 123 contact the protrusions 131 and 141 of the upper and lower support members 130 and 140, the flow of the working fluid through the through-holes 122a and 123a is blocked and the passage between the compression chamber 12 and the rebound chamber 11 is closed.

Since the flow of the working fluid through the auxiliary piston valve assembly 100 is blocked in the low-frequency mode and the high-frequency mode, the damping force can be obtained by the main piston valve assembly 30.

As described above, according to the present invention, it is possible to provide the frequency-sensitive shock absorber including the auxiliary valve that generates a damping force varying according to the frequency.

The shock absorber manufactured by the manufacturing method according to the present invention has a structure that can satisfy both the ride comfort and the steering stability, minimize the rise in costs, and make it advantage to design basic components.

While the embodiments of the present invention have been described with reference to the specific embodiments, it will be apparent to those skilled in the art that various changes and modifications may be made without departing from the spirit and scope of the invention as defined in the following claims.

DESCRIPTION OF REFERENCE NUMERALS

| | |
|---|---|
| 10: cylinder | 11: rebound chamber |
| 12: compression chamber | 20: piston rod |
| 21: connection passage | 30: main piston valve assembly |
| 31: main piston body | 32: main compression passage |
| 33: main rebound passage | 35: main compression valve portion |
| 37: main rebound valve portion | 39: band |
| 100: auxiliary piston valve assembly | 110: housing |
| 111: upper space | 112: lower space |
| 120: spool unit | 121: spool |
| 122: upper disk | 122a, 123a: through-hole |
| 123: lower disk | 124: spacer |
| 130: upper support member | 131, 141: protrusion |
| 140: lower support member | 150: lower washer |
| 151: hole | |

What is claimed is:

1. A frequency-sensitive shock absorber, which includes a cylinder filled with a working fluid and a piston rod having one end disposed inside the cylinder and the other end extending to the outside of the cylinder, the frequency-sensitive shock absorber comprising:

a main piston valve assembly installed at one end of the piston rod, and configured to operate in a state in which the inside of the cylinder is divided into a rebound chamber and a compression chamber, and generate a damping force varying according to a moving speed; and an auxiliary piston valve assembly configured to move together with the main piston valve assembly, and generate a damping force varying according to a frequency, wherein the auxiliary piston valve assembly includes:

a housing;

a spool unit configured to open or close a communication passage for communicating the rebound chamber with the compression chamber while moving within the housing; and upper and lower support members positioned inside the housing, the upper and lower support members being configured to support the spool unit, wherein the upper and lower support members have protrusions protruding toward the spool unit, respectively, and as the spool unit moves, the communication passage is closed when the protrusions of the upper and lower support members contact the spool unit, wherein the spool unit includes a spool configured to move upward and downward within the housing and upper and lower disks configured to support the spool disposed therebetween, wherein the upper and lower disks have through-holes, and wherein the through-holes are positioned outward of a position where the protrusions are contacted by the upper or lower disks, so as to block the communication passage when the upper and lower disks contact the protrusions.

2. The frequency-sensitive shock absorber according to claim 1, wherein the communication passage includes a connection passage inside the piston rod, an upper space inside the housing, through-holes formed in the upper and lower disks, a lower space inside the housing, and a hole formed in a lower washer mounted on a lower opening of the housing.

3. The frequency-sensitive shock absorber according to claim 1, wherein the upper and lower support members are made of an elastic member.

4. The frequency-sensitive shock absorber according to claim 1, wherein a distance in a direction that extends parallel to a movement of the piston rod, between the protrusion of the lower support member and the lower disk, is smaller than a distance in the direction that extends parallel to the movement of the piston rod, between the spool and a lower washer mounted on a lower opening of the housing.

5. The frequency-sensitive shock absorber according to claim 1, wherein a distance in a direction that extends parallel to a movement of the piston rod, between the protrusion of the upper support member and the upper disk, is smaller than a distance in the direction that extends parallel to the movement of the piston rod, between the spool and the piston rod.

* * * * *